United States Patent [19]
Shelby

[11] 3,907,383
[45] Sept. 23, 1975

[54] SEALED TRUNNION BEARING ASSEMBLY
[75] Inventor: Robert L. Shelby, Chillicothe, Ill.
[73] Assignee: Caterpillar Tractor Company, Peoria, Ill.
[22] Filed: Oct. 17, 1974
[21] Appl. No.: 515,703

[52] U.S. Cl. ................................. 308/3.5; 308/5 R
[51] Int. Cl.² ........................................ F16C 11/02
[58] Field of Search....... 308/5 R, 2 R, 15, 22, 36.1, 308/240, 3.5

[56] References Cited
UNITED STATES PATENTS
2,742,010   4/1956   Rabezzana ...................... 308/5 R X
3,347,577   10/1967  Carlson et al ...................... 308/2 R Primary Examiner—M. Henson Wood, Jr.
Assistant Examiner—Gene A. Church
Attorney, Agent, or Firm—Phillips, Moore, Weissenberger Lempio & Strabala

[57] ABSTRACT

A sealed trunnion bearing assembly of a type suitable for pivotably mounting various components such as hydraulic jack cylinders relative to a fixed base structure and including a U-shaped clevis secured to the base structure, a trunnion bracket encompassing the cylinder and having integral support shafts extending in opposite directions, a pair of bearing blocks separately secured to the clevis and forming annular lubricant cavities for receiving the support shafts, a lubricant fitting for introducing lubricant into the cavity and an annular seal closing each of the annular cavities around the support shafts in order to maintain lubricant within the cavity and prevent the entry of foreign matter.

9 Claims, 3 Drawing Figures

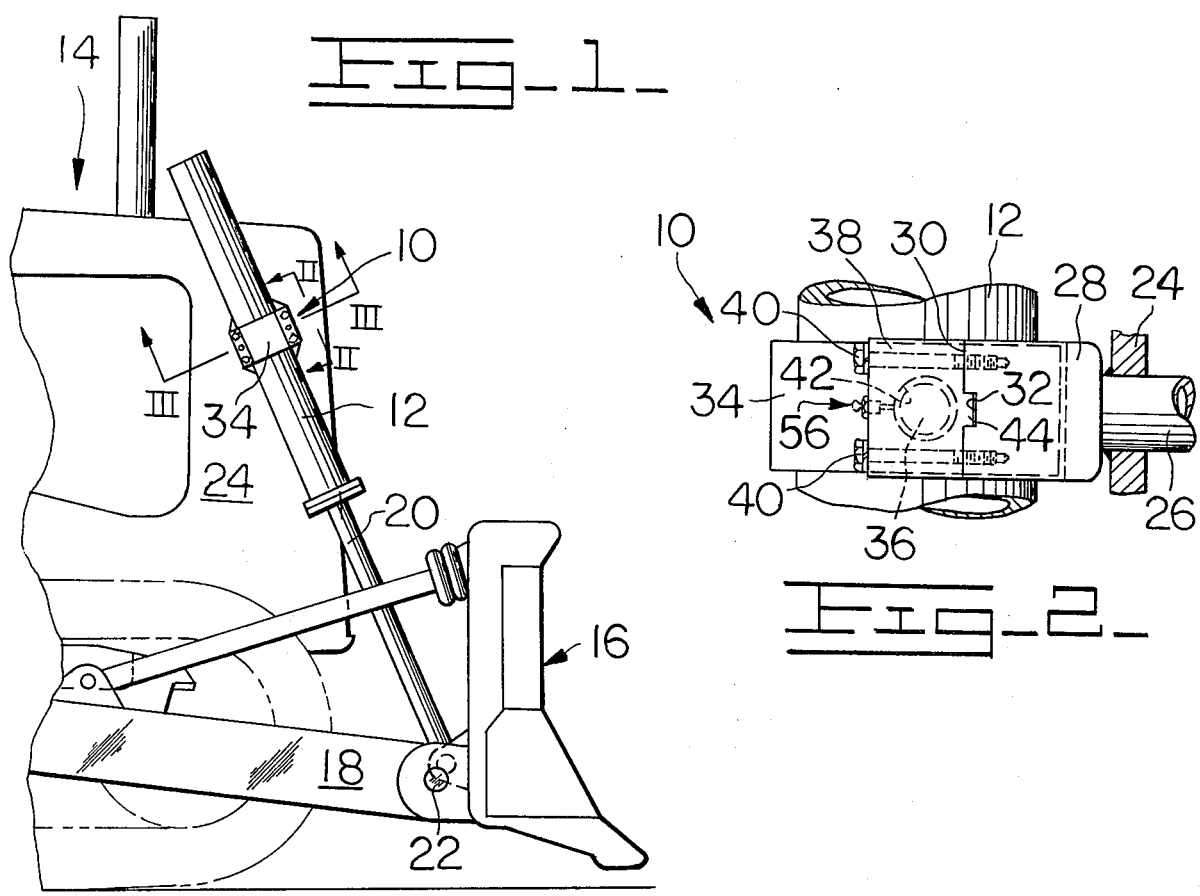

SEALED TRUNNION BEARING ASSEMBLY

BACKGROUND OF THE INVENTION

The present invention relates to a trunnion bearing assembly of a type particularly adapted for providing a pivotable mounting. The invention particularly contemplates means for permanently retaining lubricant upon the bearing surfaces of the trunnion assembly. Such trunnion assemblies are commonly employed for example in material handling equipment such as earthmoving vehicles in order to pivotably mount hydraulic jacks for operating various implements.

It has been common practice to pivotably secure the trunnion assembly to a base structure such as the vehicle by means of split bearing cap arrangements. However, the trunnion assembly and bearing caps are exposed during operation to water and other foreign matters such as dust or mud, for example, which tends to penetrate into bearing portions of the trunnion assembly, displacing lubricant in the process. If the trunnion support assemblies are not properly lubricated, the water or other foreign matter may rapidly cause rust or premature wear of the bearing surfaces.

SUMMARY OF THE INVENTION

Accordingly, it is an object of the present invention to provide a sealed trunnion assembly permitting extended retention of lubricant upon its bearing surfaces while preventing the entry of foreign matter.

It is a further object of the invention to provide a sealed trunnion assembly wherein a pair of bearing blocks each form an annular cavity for receiving one of a pair of opposite support shafts on a trunnion bracket with seals closing the annular cavities around the respective shafts.

It is an even further object of the invention to provide a sealed trunnion assembly wherein a bearing sleeve is mounted upon each of the support shafts in order to form a bearing surface in engagement with an annular bearing surface within the respective cavity and an annular seal employed to close the annular cavity.

Additional objects and advantages of the invention are made apparent below having reference to the accompanying drawing.

DESCRIPTION OF THE DRAWING

FIG. 1 is a fragmentary side view in elevation of an earthmoving vehicle providing a suitable environment for the sealed trunnion assembly of the present invention.

FIG. 2 is a view taken along section line II—II of FIG. 1.

FIG. 3 is a further enlarged view taken along section line III—III of FIG. 1 while illustrating one side portion of the trunnion assembly.

DESCRIPTION OF THE PREFERRED EMBODIMENT

Referring now to FIG. 1, the trunnion assembly of the present invention is generally indicated at 10 to provide a pivotable mounting for a hydraulic cylinder 12 on an earthmoving vehicle 14. The vehicle is of a type having a bulldozer blade 16 pivotably mounted upon push arms, one of which is indicated at 18. The hydraulic cylinder 12 includes an extendable rod 20 which is pivotably secured to one side of the blade 16 at 22 in order to raise and lower the blade relative to the vehicle. The opposite side of the blade 16 may be similarly supported by another hydraulic jack (not shown) which is similar to the cylinder 12 and may be arranged upon the opposite side of the vehicle by a similar trunnion assembly.

The trunnion assembly is mounted upon a structural guard plate 24 of the tractor, a fragment of the support plate also being illustrated in FIG. 2.

Referring now particularly to FIG. 2 as well as FIG. 3, the trunnion assembly 10 includes a transverse tube 26 extending outwardly from the guard plate 24. The tube may be permitted to rotate relative to the guard plate in order to provide oscillation of the trunnion assembly and cylinder 12 about a first longitudinal axis through the tube 26.

A U-shaped clevis 28 is integrally secured to the tube 26 and forms a mounting surface 30 on each side of the cylinder 12 (See FIG. 2). Each of the mounting surfaces 30 also forms a keyway 32 extending perpendicularly in relation to the axis of the cylinder 12.

A trunnion bracket, indicated in each of FIGS. 1-3 at 34, encompasses the cylinder 12 and is secured thereto, for example by welding. The bracket 34 also integrally forms a pair of stub shafts 36 extending outwardly in opposite directions, one of the shafts being illustrated in each of FIGS. 2 and 3.

A separate bearing block or housing 38 is secured to each of the mounting surfaces 30 by means of cap screws indicated at 40 while forming an annular cavity 42 for receiving the respective shaft 36. Each of the bearing blocks 38 is also formed with a key-like projection 44 which is received by the keyway 32 in order to limit relative movement of the bearing block 38 and prevent excessive shear forces from acting upon the screws 40. An internal annular surface 46 within the cavity 42 provides a bearing surface for supporting relative movement between the bearing block 34 and support shaft 36.

The shaft 36 may be formed for direct bearing engagement with the surface 46. However, in order to simplify construction of the trunnion bracket 34 by leaving the shafts 36 in their originally formed condition, a bearing sleeve 48 is secured about each of the support shafts 36, for example by means of a pressfit, to provide an annular bearing surface 50 arranged for interaction with the bearing surface 46.

The annular cavity 42 is sealed about the support shaft 36 by means of an annular elastomeric seal ring 52 arranged within an annular groove 54 for sealing engagement with the bearing sleeve 48. A lubricant fitting 56 is threaded into each of the bearing blocks 38 for communication with the annular cavity 42 by means of respective internal passages, one of which is indicated at 58.

During assembly, a suitable lubricant is placed in each of the lubricant cavities 42 with the bearing blocks and sleeves 48 then being arranged upon the respective support shafts 36. The seals 54 tend to maintain the lubricant within the cavity 42 while resisting entry of water or other foreign matters such as dirt or dust. The bearing blocks 38 are then secured to the mounting surfaces 30 of the clevis 28 with the key-like projections 44 being engaged within the respective keyway 32.

Accordingly, a sealed trunnion assembly is provided which has been found to provide effective lubrication over extended periods of time. For example, with the trunnion assembly being arranged upon an earthmoving vehicle as illustrated in FIG. 1 and exposed to a harsh environment of water and other foreign matter, it was found necessary to replace lubricant within the sealed trunnion assemblies only after approximately five hundred operating hours. Additional lubricant may of course be introduced into the annular cavities 42 through the fittings 56.

Accordingly, the present invention provides a sealed trunnion assembly which is particularly effective for retaining lubricant while preventing the entry of water or other foreign matter into bearing areas of the assembly.

The particular configuration and construction of the bearing blocks 38 contribute to effective operation of the seal trunnion assembly. For example, the heavy, square configuration of the bearing blocks, which also facilitates their manufacture, tends to afford protection for the bearing and sealing components of the assembly. The interlocking configuration of the bearing blocks and the U-shaped clevis adds further rigid support for the assembly while the bearing sleeves afford a simple and economical means for providing a durable bearing surface.

I claim:

1. A sealed assembly for pivotably mounting a movable element relative to a base structure while permitting extended retention of lubricant therein, comprising a U-shaped clevis secured to the base structure, a trunnion bracket secured to the movable element and including support shafts extending in opposite directions, a pair of bearing blocks separately secured to the U-shaped clevis and each forming an annular lubricant cavity which is closed at one end and open at the other end for respectively receiving the support shafts, the cavity including an annular bearing surface, a lubricant fitting in communication with the annular cavity of each bearing block for introducing lubricant therein into, and an annular seal arranged adjacent the open end of the annular cavity to close the cavity around the support shaft, thereby maintaining lubricant within the cavity and preventing the entry of foreign matter.

2. The sealed trunnion assembly of claim 1 further comprising a support shaft integrally secured to the U-shaped clevis while providing a mounting relative to the base structure.

3. The sealed trunnion assembly of claim 1 further comprising a bearing sleeve encompassing each support shaft and forming an annular bearing surface for interaction with the annular bearing surface in the respective annular cavity.

4. The sealed trunnion assembly of claim 3 wherein the annular seal comprises an elastomeric seal ring arranged within an annular groove in one of the bearing block and bearing sleeve for sealing engagement with the other of the bearing block and bearing sleeve.

5. The sealed trunnion assembly of claim 1 wherein each bearing block comprises means interlocking with the U-shaped clevis to resist movement between the U-shaped clevis and respective bearing blocks.

6. The sealed trunnion assembly of claim 5 further comprising a bearing sleeve encompassing each support shaft and forming an annular bearing surface for interaction with the annular bearing surface in the respective annular cavity.

7. The sealed trunnion assembly of claim 6 further comprising an elastomeric seal ring arranged within an annular groove in the bearing block for sealing engagement with the bearing sleeve.

8. The sealed trunnion assembly of claim 7 further comprising a shaft being integrally secured to the U-shaped clevis while being rotatably mounted relative to the base structure, the movable element comprising the cylinder of a hydraulic jack and the base structure comprising an element of an earthmoving machine.

9. The sealed trunnion assembly of claim 1 adapted to provide a pivotable mounting for the cylinder of a hydraulic jack.

* * * * *